United States Patent

Hashizume et al.

(10) Patent No.: US 7,849,442 B2
(45) Date of Patent: Dec. 7, 2010

(54) APPLICATION REQUIREMENT DESIGN SUPPORT SYSTEM AND METHOD THEREFOR

(75) Inventors: Fumiko Hashizume, Yokohama (JP); Toyomitsu Yoneda, Tokyo (JP); Shuji Soga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 632 days.

(21) Appl. No.: 11/014,782

(22) Filed: Dec. 20, 2004

(65) Prior Publication Data

US 2006/0058992 A1 Mar. 16, 2006

(30) Foreign Application Priority Data

Aug. 30, 2004 (JP) ............................. 2004-249427

(51) Int. Cl.
*G06F 9/44* (2006.01)
(52) U.S. Cl. ............ 717/121; 717/102; 717/109; 717/111; 717/112; 717/123
(58) Field of Classification Search ........... 717/101, 717/102
See application file for complete search history.

(56) References Cited

U.S. PATENT DOCUMENTS

| | | | |
|---|---|---|---|
| 5,673,199 A * | 9/1997 | Gentry | 703/1 |
| 6,385,563 B1 * | 5/2002 | Vora et al. | 703/6 |
| 6,434,568 B1 * | 8/2002 | Bowman-Amuah | 707/103 R |
| 7,076,762 B2 * | 7/2006 | Fisher | 717/102 |
| 2002/0099461 A1 * | 7/2002 | Anami et al. | 700/97 |
| 2002/0116543 A1 * | 8/2002 | Wilson | 709/321 |
| 2002/0184401 A1 * | 12/2002 | Kadel et al. | 709/315 |

FOREIGN PATENT DOCUMENTS

| | | |
|---|---|---|
| JP | 09-212353 | 8/1997 |
| JP | 2002-358200 | 12/2002 |

* cited by examiner

*Primary Examiner*—Tuan Q Dam
*Assistant Examiner*—Isaac T Tecklu
(74) *Attorney, Agent, or Firm*—Antonelli, Terry, Stout & Kraus, LLP.

(57) ABSTRACT

A client receives an input of a new case, extracts a common framework corresponding to the new case from a common framework database, and extracts existing contents corresponding to the new case from an existing contents database. The client assigns the extracted existing contents to the extracted common framework to create an assignment by common framework table and then extracts application requirements regarding the new case according to the table.

20 Claims, 20 Drawing Sheets

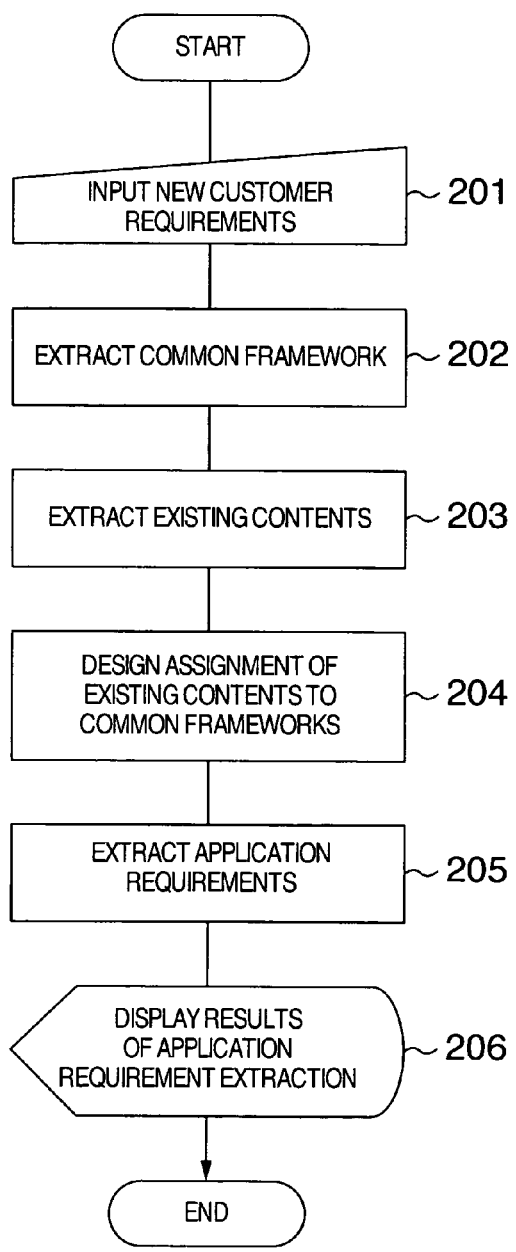
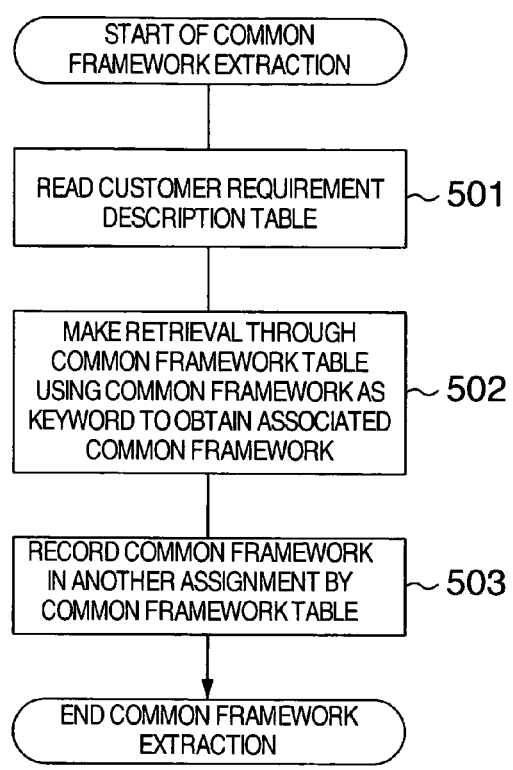

FIG.3A

COMMON FRAMEWORK TABLE  ⟋300

| WORK KIND | WORK (LARGE) | WORK (INTERMEDIATE) | WORK (SMALL) |
|---|---|---|---|
| MANUFACTURING INDUSTRY | PROCUREMENT | PROCUREMENT PLAN | PROCUREMENT PLAN CREATION |
| | | | REQUIRED AMOUNT PLAN |
| | | | ... |
| | | PROCUREMENT WORK | ORDER ISSUANCE |
| | | | SUPPLY |
| | | | ... |
| | | PROCUREMENT MANAGEMENT | PROCUREMENT SOURCE MANAGEMENT |
| | | | ANALYSIS |
| | | | ... |
| | PRODUCTION | PRODUCTION PLAN | DAY'S PLAN |
| | | | INVENTORY PLAN |
| | | | ... |
| | | PRODUCTION WORK | ... |
| | | PRODUCTION MANAGEMENT | ... |
| | DESIGN | ... | ... |
| | ... | ... | ... |

FIG.3B

CUSTOMER REQUIREMENT DESCRIPTION TABLE

301

| CATEGORY | | | CUSTOMER REQUIREMENTS |
|---|---|---|---|
| 302 COMMON FRAMEWORK | OBJECTIVE WORK KIND | | MANUFACTURING INDUSTRY |
| | OBJECTIVE WORK 1 | HIERARCHY | LARGE |
| | | NAME | PRODUCTION |
| | OBJECTIVE WORK 2 | HIERARCHY | LARGE |
| | | NAME | PROCUREMENT |
| | ... | ... | ... |
| 303 WORK REQUIREMENTS | WORK OBJECT 1 | | INVENTORY REDUCTION |
| | WORK OBJECT 2 | | PROCUREMENT LEAD TIME REDUCTION |
| | ... | | ... |
| 304 SYSTEM REQUIREMENTS | SYSTEM SIZE | | INTERMEDIATE |
| | PRICE | | 5 TO 10 MILLION YEN |
| | RELIABILITY | | INTERMEDIATE |

FIG.4

ASSIGNMENT BY COMMON FRAMEWORK TABLE 401

| COMMON FRAMEWORK 402 | | | OBJECT ACHIEVING METHOD 403 | APPLICATION PRODUCT 404 | COMMON FRAME ANOTHER DEVELOPMENT PLAN 405 |
|---|---|---|---|---|---|
| WORK (LARGE) | WORK (INTERMEDIATE) | WORK (SMALL) | | | |
| PROCUREMENT | PROCUREMENT PLAN | PROCUREMENT PLAN CREATION | 5 | NULL | NEW DEVELOPMENT |
| | | REQUIRED AMOUNT PLAN | 5 | A | CUSTOMIZE |
| | | ... | ... | ... | ... |
| | PROCUREMENT WORK | ORDER ISSUANCE | 1 | A | CUSTOMIZE |
| | | SUPPLY | NULL | A | FUNCTION APPLICATION |
| | | ... | ... | ... | ... |
| | PROCUREMENT MANAGEMENT | PROCUREMENT SOURCE MANAGEMENT | 7 | A | CUSTOMIZE |
| | | ANALYSIS | NULL | C | FUNCTION APPLICATION |
| | | ... | ... | ... | ... |
| PRODUCTION | PRODUCTION PLAN | DAY'S PLAN | 10 | NULL | NEW DEVELOPMENT |
| | | INVENTORY PLAN | 2 | B | CUSTOMIZE |
| | | ... | ... | ... | ... |
| | PRODUCTION WORK | ... | ... | ... | ... |
| | PRODUCTION MANAGEMENT | ... | ... | ... | ... |
| SALES | SALES MANAGEMENT | SALES PLAN AND ACTUAL RESULT MANAGEMENT | 2 | B | CUSTOMIZE |
| ... | ... | ... | ... | ... | ... |

FIG.6A

OBJECT ACHIEVING METHOD TABLE 600

| METHOD ID | TITLE (602) | WORK OBJECT (603) | COMMON FRAMEWORK (604) | | | |
|---|---|---|---|---|---|---|
| | | | OBJECTIVE WORK | WORK (LARGE) | WORK (INTERMEDIATE) | WORK (SMALL) |
| 001 | ORDERING METHOD A | PROCUREMENT LEAD TIME REDUCTION | MANUFACTURING INDUSTRY | PROCUREMENT | PROCUREMENT WORK | ORDER ISSUANCE |
| 002 | INVENTORY PLAN METHOD A | INVENTORY REDUCTION | MANUFACTURING INDUSTRY | PRODUCTION | PRODUCTION PLAN | INVENTORY PLAN |
| | | | | SALES | SALES MANAGEMENT | SALES PLAN AND ACTUAL RESULT MANAGEMENT |
| 003 | DESIGN METHOD A | DESIGN PRECISION IMPROVEMENT | MANUFACTURING INDUSTRY | DESIGN | DESIGN WORK | DESIGN |
| ... | ... | ... | ... | ... | ... | ... |

FIG.6B

OBJECT ACHIEVING METHOD FUNCTION TABLE (METHOD ID=001) ~601

| METHOD ID | COMMON FRAMEWORK | | | WORK FUNCTION | SYSTEM FUNCTION | DETAILED DESIGN INFORMATION |
|---|---|---|---|---|---|---|
| | WORK (LARGE) | WORK (INTERMEDIATE) | WORK (SMALL) | | | |
| 001 | PROCUREMENT | PROCUREMENT WORK | ORDER ISSUANCE | ORDER INSTRUCTION | ORDER INSTRUCTION INPUT | ... |
| | | | | | DELIVERY DATE RESPONSE RECEPTION | ... |
| | | | | PRE-ORDER ISSUANCE | | |

APPLICATION PRODUCT TABLE                         700

| PRODUCT ID | PRODUCT NAME | SYSTEM SIZE | PRICE | RELIABILITY | OBJECTIVE WORK KIND |
|---|---|---|---|---|---|
| 0001 | A | LARGE | 50 MILLION YEN | INTERMEDIATE | MANUFACTURING INDUSTRY |
| 0002 | B | INTERMEDIATE | 8 MILLION YEN | HIGH | MANUFACTURING INDUSTRY |
| 0003 | C | SMALL | 3 MILLION YEN | INTERMEDIATE | MANUFACTURING INDUSTRY |
| ... | | ... | ... | ... | ... |

FIG. 7B

APPLICATION PRODUCT FUNCTION TABLE (PRODUCT ID = 0001) — 701

| COMMON FRAMEWORK | | | | SYSTEM FUNCTION | DETAILED DESIGN INFORMATION |
|---|---|---|---|---|---|
| WORK (LARGE) | WORK (INTERMEDIATE) | WORK (SMALL) | WORK FUNCTION | | |
| PROCUREMENT | PROCUREMENT WORK | ORDER ISSUANCE | ORDER INSTRUCTION | ORDER POINT PLAN INPUT | |
| | | | | ORDER POINT PLAN TRANSMISSION | |
| | | | | ORDER INSTRUCTION INPUT | |
| | | | | ORDER FORM ISSUANCE | |
| | | SUPPLY | REMAINING ORDER MANAGEMENT | ORDER STATEMENT ENQUIRY | ... |
| | | DAY'S PLAN | ... | ... | ... |
| | | ... | DAY'S PLAN CREATION | ... | ... |
| PRODUCTION | PRODUCTION PLAN | ... | ... | ... | ... |

702 — COMMON FRAMEWORK; 703 — WORK FUNCTION; 704 — SYSTEM FUNCTION; 705 — DETAILED DESIGN INFORMATION

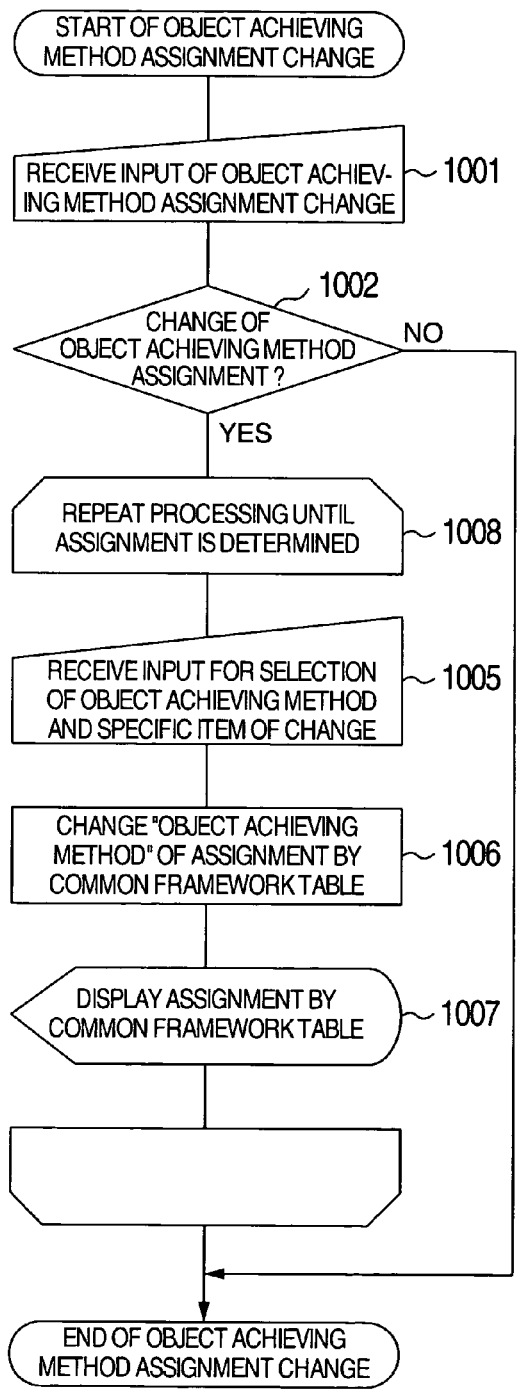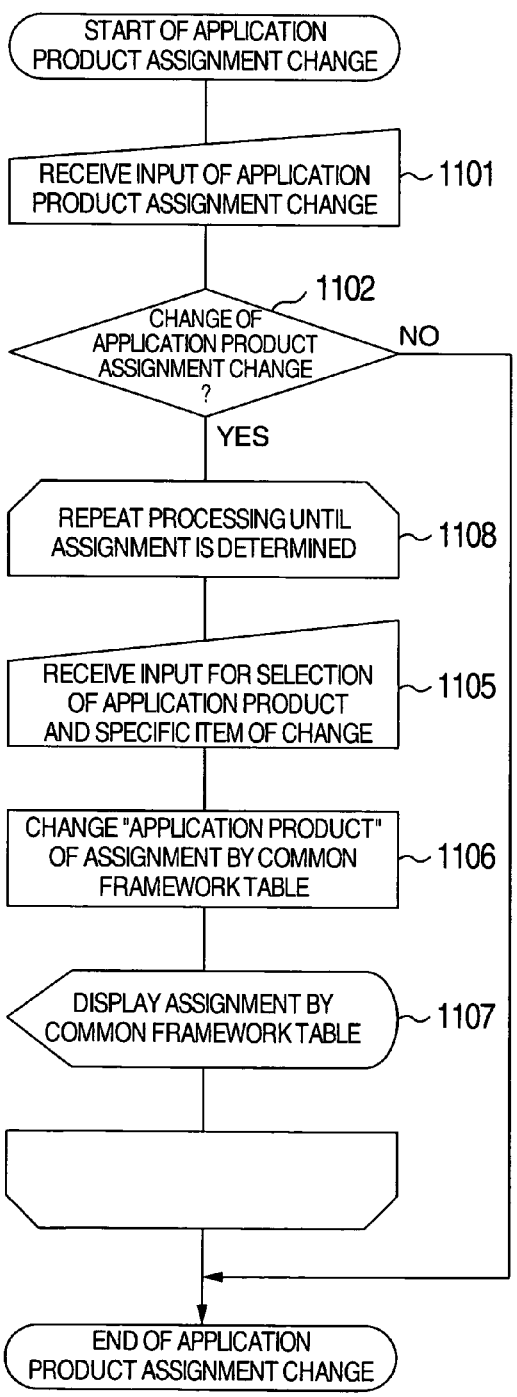

FIG. 12

NEW SYSTEM FUNCTION TABLE 1200

| COMMON FRAMEWORK 1201 | | | NEW WORK FUNCTION 1202 | NEW SYSTEM FUNCTION 1203 | DEVELOPMENT PLAN BY SYSTEM FUNCTION 1204 | DETAILED DESIGN INFORMATION 1205 |
|---|---|---|---|---|---|---|
| WORK (LARGE) | WORK (INTERMEDIATE) | WORK (SMALL) | | | | |
| PROCUREMENT | PROCUREMENT WORK | ORDER ISSUANCE | ORDER INSTRUCTION | ORDER POINT PLAN INPUT | FUNCTION APPLICATION | |
| | | | ORDER INSTRUCTION | ORDER POINT PLAN TRANSMISSION | FUNCTION APPLICATION | |
| | | | ORDER INSTRUCTION | ORDER INSTRUCTION INPUT | CUSTOMIZE | |
| | | | ORDER INSTRUCTION | ORDER FORM ISSUANCE | FUNCTION APPLICATION | |
| | | | REMAINING ORDER MANAGEMENT | DELIVERY DATE RESPONSE RECEPTION | NEW DEVELOPMENT | |
| | | | REMAINING ORDER MANAGEMENT | ORDER STATEMENT ENQUIRY | FUNCTION APPLICATION | |
| | | | PRE-ORDER ISSUANCE | ... | (COMPLETE FUNCTION APPLICATION) | |
| | | | PRE-ORDER ISSUANCE | PRE-ORDER ISSUANCE INPUT | NEW DEVELOPMENT | |
| | | | PRE-ORDER ISSUANCE | ... | (COMPLETELY NEW DEVELOPMENT) | |

FIG.13A

WORK FUNCTION COMPARISON TABLE 1300

| COMMON FRAMEWORK 1302 | | | NEW WORK FUNCTION 1303 | OBJECT ACHIEVING METHOD WORK FUNCTION 1304 | APPLICATION PRODUCT WORK FUNCTION 1305 | DEVELOPMENT PLAN BY WORK FUNCTION 1306 |
|---|---|---|---|---|---|---|
| WORK (LARGE) | WORK (INTERMEDIATE) | WORK (SMALL) | | | | |
| MATERIAL PROCUREMENT | PURCHASE WORK | ORDER ISSUANCE | ORDER INSTRUCTION | ORDER INSTRUCTION | ORDER INSTRUCTION | CUSTOMIZE |
| | | | REMAINING ORDER MANAGEMENT | NULL | REMAINING ORDER MANAGEMENT | FUNCTION APPLICATION |
| | | | PRE-ORDER ISSUANCE | PRE-ORDER ISSUANCE | NULL | NEW DEVELOPMENT |

FIG.13B

SYSTEM FUNCTION COMPARISON TABLE ~1301

| NEW WORK FUNCTION | NEW SYSTEM FUNCTION | OBJECT ACHIEVING METHOD SYSTEM FUNCTION | APPLICATION PRODUCT SYSTEM FUNCTION | DEVELOPMENT PLAN BY SYSTEM FUNCTION |
|---|---|---|---|---|
| ORDER INSTRUCTION | ORDER POINT SUPPLEMENT PLAN INPUT | NULL | ORDER POINT SUPPLEMENT PLAN INPUT | FUNCTION APPLICATION |
| | ORDER POINT PLAN TRANSMISSION | NULL | ORDER POINT PLAN TRANSMISSION | FUNCTION APPLICATION |
| | ORDER INSTRUCTION INPUT | ORDER INSTRUCTION INPUT | ORDER INSTRUCTION INPUT | CUSTOMIZE |
| | ORDER FORM ISSUANCE | NULL | ORDER FORM ISSUANCE | FUNCTION APPLICATION |
| | DELIVERY DATE RESPONSE RECEPTION | DELIVERY DATE RESPONSE RECEPTION | NULL | NEW DEVELOPMENT |

Columns: 1312, 1307, 1308, 1309, 1310

FIG.13C

SIMILAR FUNCTION NAME TABLE ~1311

| No. | FUNCTION NAME 1 | FUNCTION NAME 2 | --- |
|---|---|---|---|
| 1 | PURCHASE | PROCUREMENT | --- |
| 2 | INSTRUCTION | ARRANGEMENT | --- |
| 3 | DEGREE OF PROGRESS | PROGRESS | --- |
| 4 | ORDER FORM | ORDER STATEMENT | --- |
| --- | --- | --- | --- |

APPLICATION REQUIREMENT DESIGN SUPPORT SYSTEM AND METHOD THEREFOR

INCORPORATION BY REFERENCE

The present application claims priority from Japanese application JP 2004-249427 filed on Aug. 30, 2004, the content of which is hereby incorporated by reference into this application.

BACKGROUND OF THE INVENTION

The present invention relates to an application design support system and a method for the system for use in a system development, and in particular, to an application requirement design support system and a method for the system in which to construct a new system, design information based on system construction examples or cases in the past is combined with design information of existing application products to be reused to design application requirements.

Heretofore, methods of customizing and/or reusing design information prepared by assuming reuse thereof in advance have been provided. For example, JP-A-2002-358200 describes a technique in which by creating flexible software which has high reusability and which can be easily customized, a device for constructing a work system and a work system are implemented while reducing work system developing costs. For this purpose, there are prepared middleware which is basic software shared among various works, frameworks which are categorized by works and which are basic constituent components software, and components which are standardized modules or customized variation modules prepared according to requests from a user and which are attached to and detached from the frameworks according to necessity. The work system constructing device constructs software of a work system by combining the middleware, the frameworks categorized by works, and the components with each other.

There has also been provided a method of efficiently extracting reusable design information from existing design information which has not been prepared assuming reuse of the information. For example, JP-A-09-212353 describes an information processor which appropriately obtains design information for reuse from past design information according to a system development request specification. For this purpose, past design information (diversion source information) reused for design, diversion destination information obtained by diverting or modifying the design source information, identifying information of the diversion source and destination information, and relational information including know-how regarding the reuse such as an object of and a reason for the reuse and a modifying method are stored in a database. In new design of system software, the information processor accesses the database to retrieve therefrom relational information having the specific information items of reuse matching a system development request specification to thereby extract reusable design information.

SUMMARY OF THE INVENTION

However, there has not been provided a method of reusing existing design information items which are not prepared assuming reuse thereof by combining the information items with each other, to thereby extract application requirements of a new system. This is because of a problem as follows. The existing design information items designed without assuming reuse thereof are not unified in definitions such as definitions of names and ranges of work or work functions and system functions. This leads to a problem in which it is difficult to establish a correspondence between work functions and system functions when combining design information items with each other.

It is therefore an object of the present invention to provide a design support system to support design of application requirements in a new system in which a job to establish a correspondence between work functions and system functions is facilitated to reuse existing design information items designed without assuming reuse thereof by combining the design information items with each other.

To achieve the object, there is provided an application requirement design support system and a method therefore in accordance with the present invention in which information regarding a new case is received and common frameworks regarding works included in information of the new case are extracted from a common framework database. Existing contents corresponding to the information of the new case are extracted from an existing contents database. The extracted contents are assigned to the extracted common frameworks to produce an assignment table for each common framework. According to the assignment tables thus produced, application requirements regarding the new case are extracted.

Other objects, features and advantages of the invention will become apparent from the following description of the embodiments of the invention taken in conjunction with the accompanying drawings.

BRIEF DESCRIPTION OF THE DRAWINGS

FIG. 2 is a flowchart showing a main flow of application requirement design support processing;

FIGS. 3A and 3B are diagrams showing a common framework table and a customer requirement description table;

FIG. 4 is a diagram showing an assignment by common framework table;

FIG. 5 is a flowchart showing in detail common framework extraction processing (Step 202 of FIG. 2);

FIGS. 6A and 6B are diagrams showing an object achieving method table and an object achieving method function table;

FIGS. 7A and 7B are diagrams showing an application product table and an application product function table;

FIG. 10 is a flowchart showing in detail object achieving method assignment change processing (Step 905 of FIG. 9);

FIG. 11 is a flowchart showing in detail application product assignment change processing (Step 906 of FIG. 9);

FIG. 12 is a diagram showing a new system function table;

FIGS. 13A, 13B, and 13C are diagrams showing a work function comparison table, a system function comparison table, and a similar function name table;

DESCRIPTION OF THE EMBODIMENTS

Figure 1:
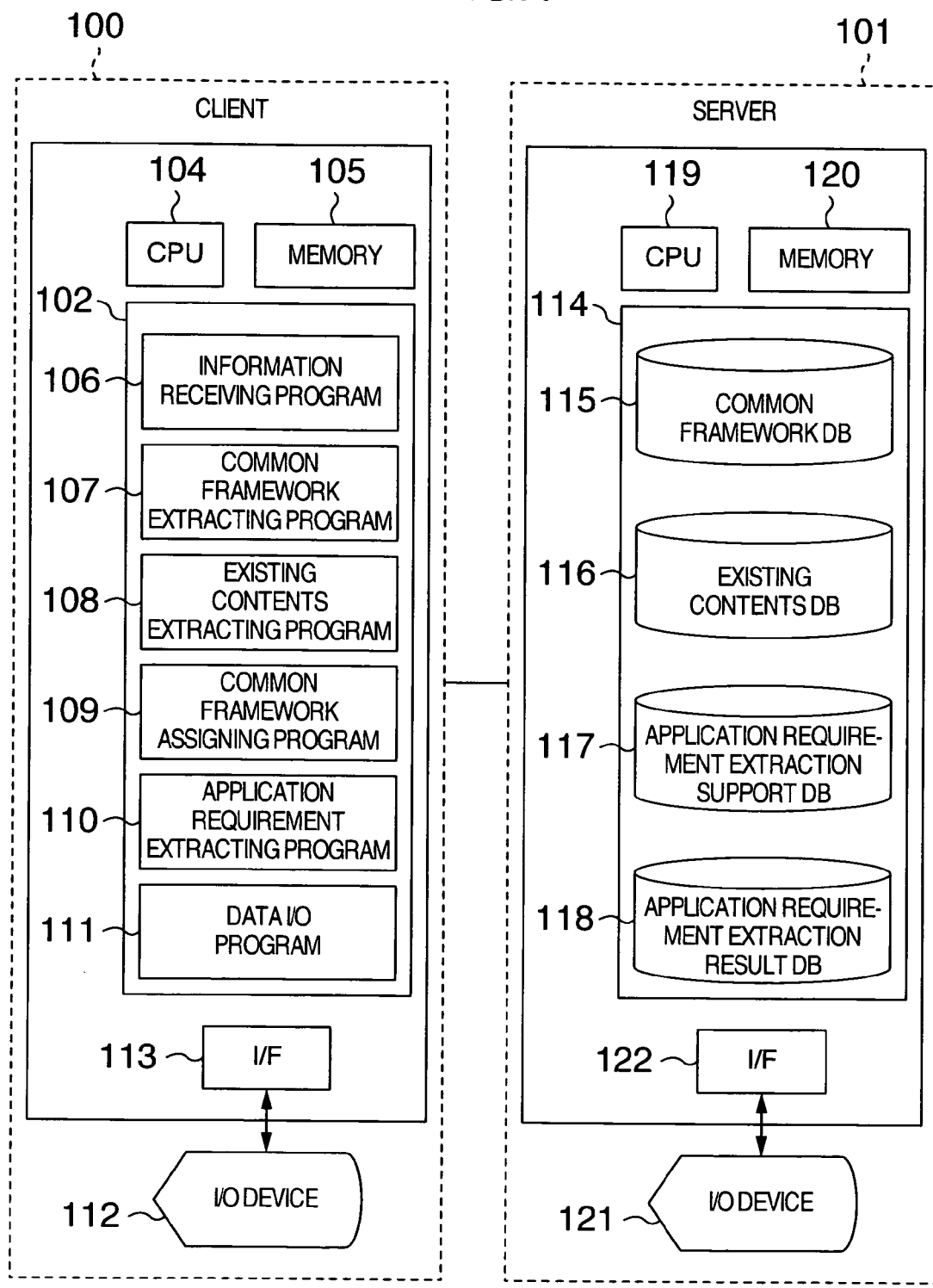
FIG. 1 is a block diagram showing a system configuration of an embodiment of an application requirement design support system according to the present invention.

Referring now to the drawings, description will be given in detail of an embodiment according to the present invention. However, the present invention is not restricted by the embodiment.

FIG. 1 shows a system configuration of the embodiment of an application requirement design support system. The system includes a client 100 and a server 101. The client 100 includes a storage such as a hard disk or a nonvolatile memory to store therein programs 102 (i.e., program products) to support the application requirement design.

The client 100 includes a central processing unit (CPU) 104 as its processor which reads an appropriate program from the programs 102 to load the program in a memory 105 and executes the program. The programs 102 include an information receiving program 106, a common framework extraction program 107, an existing contents extraction program 108, a common framework assigning program 109, an application requirement extraction program 110, and a data input/output program 111.

The frameworks are used to combine a plurality of design information items with each other according to the present invention. The framework is a common framework which can be commonly used to be associated with any design information item. The embodiment employs a work function hierarchy defined in advance by standardizing or systematizing hierarchic relationships between work functions.

The existing contents include design information of a specific method (to be referred to as an object achieving method hereinbelow) having achieved objects of customers in past system construction cases and design information of existing application products. To carry out an object achieving method corresponding to new customer requirements, the embodiment uses functions of existing application products according to necessity to design application requirements of a new system.

The application requirements include work functions and/or system functions of a new system, development plans thereof including "function application" to apply a standard function of an application product, "customize" to customize a specification of a standard function of an application product, or "new development" to develop a new function; and existing design information (design information of an object achieving method and design information of an application product) reusable in the development according to the development plans.

The client 100 includes, as an information processor, an interface 113 and an input/output device 112. The interface 113 executes data communication with various external devices and the input/output device 112. The device 112 includes an output interface to output various data items and an input interface to receive selection and indication from a user of the system.

The server 101 includes databases 114. The client 100 can access the databases 114 of the server 101 via a network. The databases 114 include a common framework database 115, an existing contents database 116, an application requirement extraction support database 117, and an application requirement extraction result database 118. As an information processing device, the server 101 includes a CPU 119 as its processor, a memory 120, an interface 122 to execute data communication with various external devices and an input/output device 121 including an output interface to output various data and an input interface to receive selection and indication from an operator of the system.

FIG. 2 shows a main flow of the application requirement design support processing in the embodiment. In the following description, the programs 102 of the schedule 100 conduct various operations associated with the application requirement design support processing. The information receiving program 106 commonly executes, through each associated processing procedure, processing to receive information via the input/output device 112 from, for example, a user. The data input/output program 111 commonly executes, through each associated processing procedure, data input/output processing.

The input/output device 112 of the client 100 receives input of requirements of a user to construct a new system (to be referred to as new customer requirements herein below; Step 201). The common framework extraction program 107 then collates the requirements with data in the common framework database 115 to extract common frameworks corresponding to the new customer requirements (Step 202). The existing contents extraction program 108 collates the requirements with data in the existing contents database 116 to extract existing contents (an object achieving method and an application product) corresponding to the new customer requirements (Step 203).

The common framework assigning program 109 assigns the existing contents (an object achieving method and an application product) extracted in Step 203 to the common frameworks extracted in Step 202 (Step 204). According to a result of assignment to the common framework in Step 204, the application requirement extraction program 110 extracts application requirements of the new system for each common framework (Step 205). Finally, the input/output device 112 displays the application requirements extracted in Step 205 (Step 206), which terminates the processing.

Subsequently, description will be given of the detailed processing flow in steps 202 to 205 of FIG. 2 and table and/or screen images used in the processing.

FIGS. 3A and 3B respectively show a common framework table 300 (FIG. 3A) as a database employed in the common framework extraction processing of FIG. 2 and a customer requirement description table 301 (FIG. 3B) displayed in the input receiving processing to receive new customer requirements (Step 201) of FIG. 2.

The common framework table 300 is stored in, for example, the common framework database 115. As described above, the embodiment uses common frameworks in a work function hierarchy beforehand defined by standardizing or systematizing hierarchic relationships between work functions. The table 300 of FIG. 3A indicates a data layout example when the work kind is "manufacturing industry". As can be seen from the example of FIG. 3A, for the common frameworks of the embodiment, the work hierarchy includes three hierarchic levels "large", "intermediate", and "small" according to ranges of the works for the respective industry sizes for definitions thereof.

The input/output device 112 displays to the user the customer requirement description table 301. In the new customer requirement input receiving processing (Step 201 of FIG. 2), when the user selects one of the keywords for each category set in the data layout example of the table 301, the input of new customer requirements is received. The categories of the table 301 are, for example, "objective work kind"- and "objective work" for a common framework 302, "work object" as a requirement of work (work requirement 303), "system size", "price", and "reliability" as requirements for the system (system requirements). For each of "objective work" and "work object", the user can input a plurality of input items.

FIG. 4 is an assignment by common framework table 401 as a database used in the common framework extraction processing (Step 202), the existing contents extraction processing (Step 203), the processing of assignment design to assign existing contents to common frameworks (Step 204), the application requirement extraction processing (Step 205), and the application requirement extraction result display processing (Step 206) shown in FIG. 2.

The table 401 is stored in, for example, the requirement extraction result database 118. The table 401 is a database in which "common framework 402" extracted in the extraction processing (Step 202) and the existing contents ("object achieving method 403" and "application product 404") extracted in the extraction processing (Step 203) are described in one record together with an associated common framework. The table 401 also includes as a data item "development plan for each common framework 405" which is an application requirement extracted in the extraction processing (Step 205). At initial record creation, "null" is automatically set as an initial value to each item. The table 401 is not only a database but also is used as an input/output screen image when the input/output device 112 displays the table layout thereon.

FIG. 5 shows in detail the common framework extraction processing (Step 202) of FIG. 2. The common framework extraction program 107 first reads the table 301 (FIG. 3B; Step 501). Using as a keyword the customer requirement stored in the common framework 302 of the table 301, the program 107 makes a search through the common framework table 300 (FIG. 3A) to obtain an associated common framework (Step 502). Finally, the program 107 describes the common framework obtained in Step 502 in the field of "common framework 402" of the table 401 (Step 503) and then terminates the processing.

FIGS. 6A and 6B are databases used in the existing contents extraction processing (Step 203). Specifically, FIG. 6A shows an object achieving method table 600 and FIG. 6B shows an object achieving method function table. The tables 600 and 601 are stored in, for example, the existing contents database 116.

The table 600 is a database including description of a list of object achieving methods according to past system construction cases and includes for each object achieving method an identifier (ID) information (method ID), "title 602" of the method, "work object 603" of a customer's having successfully used the method, "common framework 604" as correspondence information with the object achieving methods and the common frameworks (information indicating which portions of the common frameworks correspond to the object achieving methods, the information being defined according to the common frameworks defined in the common framework table 300) with a correspondence established therebetween. These information items include a plurality of keywords beforehand defined for each category.

The object achieving method function table 601 is a database including description of a list of functions for each object achieving method and includes "common framework 605" as correspondence information with respect to a common framework, "work function 606", "system function 607", and "detailed design information 608" (detailed information such as a kind and a storage location of design information).

FIGS. 7A and 7B show databases for application products used in the existing contents extraction processing (Step 203) of FIG. 2. FIG. 7A is an application product table 700 and FIG. 7B is an application product function table 701. The tables 700 and 701 are stored in, for example, the existing contents database 116.

The table 700 is a database including description of a list of existing application products and includes a product ID of an associated application product as information to identify the product, a product name, a system size, a price, reliability, and an objective work kind. The information items include a plurality of keywords beforehand defined for each category.

The table 701 is a database including description of a list of existing application products and includes, "common framework 702" as correspondence information with respect to a common framework, "work function 703", "system function", and "detailed design information 705".

Figure 8:
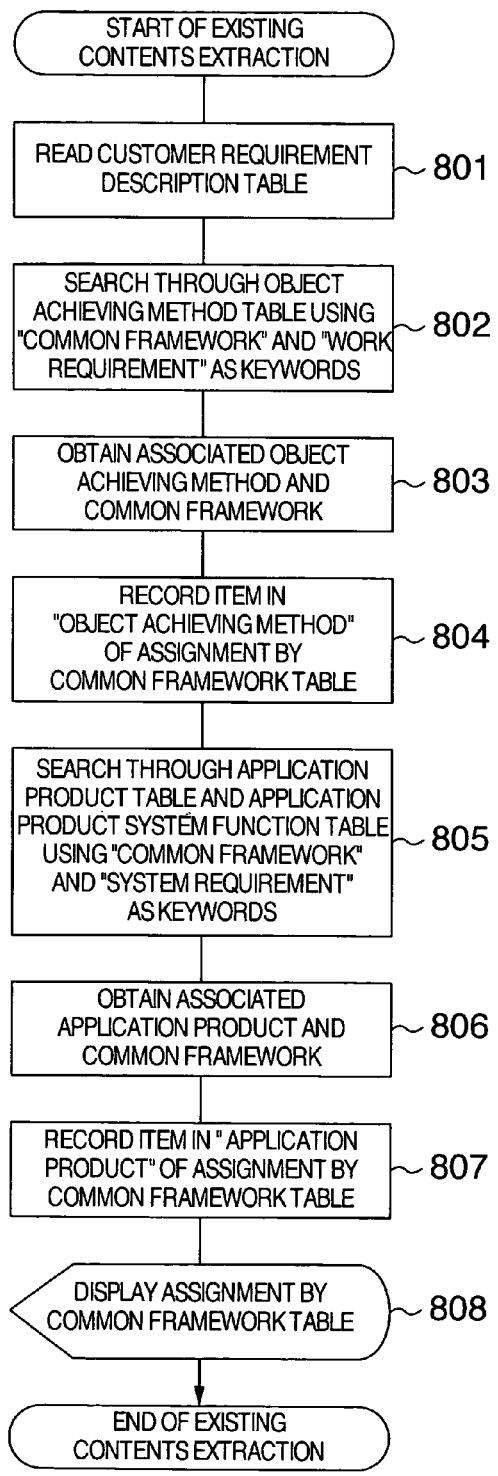
FIG. 8 is a flowchart showing in detail existing contents extraction processing (Step 203 of FIG. 2)

FIG. 8 shows a detailed flow of the existing contents extraction processing (Step 203) of FIG. 2. The existing contents extraction program 108 first reads a customer requirement description table 301 of FIG. 3B (Step 801). Using as a keyword the information items stored in the fields of "common framework 302" and "work requirement 303" of the table 301, the program 108 makes a search through the object achieving method table 600 of FIG. 6A (Step 802). The program 108 resultantly obtains an associated object achieving method and "common framework 604" as correspondence information between the method and a common framework (Step 803).

Thereafter, using information contained in "common framework 604" obtained in Step 803, the program 108 records information regarding the object achieving method (for example, an identifier of the object achieving method) in the "object achieving method 403" field of a record of the associated common framework in the assignment by common framework table 401 (Step 804). If the common framework corresponding to the object achieving method obtained in Step 803 is absent from the assignment by common framework table 401, the program 108 creates a new record, writes "common framework 604" obtained in Step 803 in the "common framework 402" field and the object achieving method (for example, a method ID of the method) obtained in Step 803 in the "object achieving method 403" field.

Subsequently, using as a keyword the information stored in the "system requirement 304" field of the table 301 and the information in the "common framework 402" field of the table 401, the program 108 makes a search through the application product table 700 and the application product function table 701 to obtain an associated application product from the table 700 and then obtains information from the "common framework 702" field of the table 701 corresponding to the application product (Step 806). Using the information obtained from the "common framework 702" field in Step 806, the program 108 records the application product, e.g., a product name in the "application product 404" field of a record of the associated common framework in the assignment by common framework table 401 (Step 807) and displays the table 401 created by the processing (Step 808).

Figure 9:
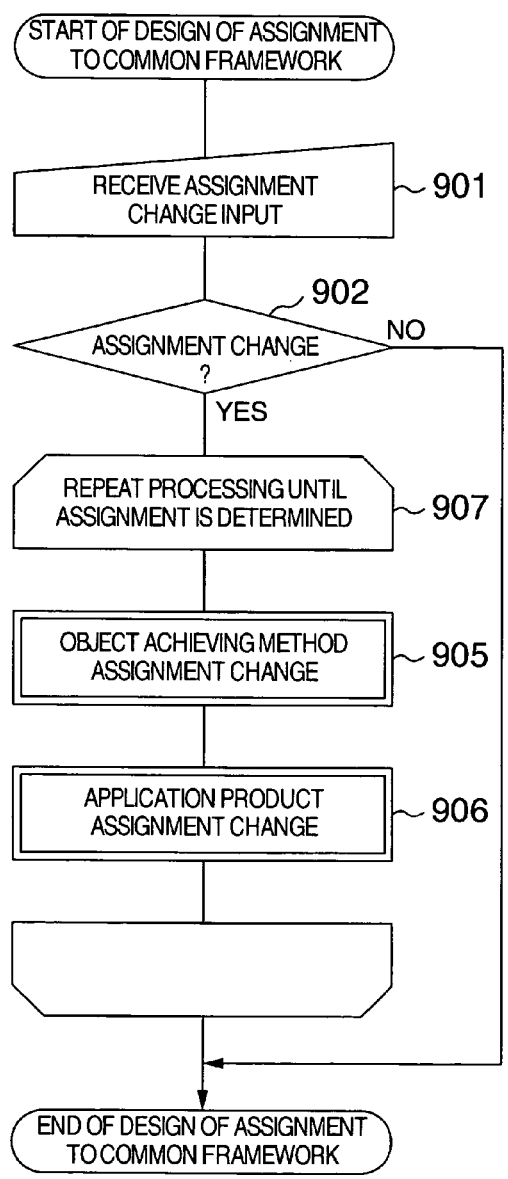
FIG. 9 is a flowchart showing in detail processing of design of assignment to common frameworks (Step 204 of FIG. 2)

FIG. 9 shows a detailed operation flow of processing of designing assignment to common frameworks (Step 204) of FIG. 2. The input/output device 112 receives a selection input to determine whether or not the assignment of existing contents to common frameworks is changed (Step 901). In a situation to change the assignment, the assignment by common framework table 401 displayed in the existing contents extraction (Step 203) is modified to change an object achieving method or an application product to be used in the new system. In a situation not to change the assignment, the object achieving methods and the application products are assigned to the common frameworks according to the assignment by common framework table 401 displayed in the existing contents extraction (Step 203 of FIG. 2) to thereby extract application requirements.

If the information received in Step 901 indicates "not to change the assignment" (NO in Step 902), the common framework assigning program 109 terminates the common framework assignment processing. If the information received in Step 901 indicates "to change the assignment" (YES in Step 902), the program 109 changes the assignment of the object achieving methods (Step 905). The processing in Step 905 will be described later in detail by referring to FIG. 10, which will be described later. The program 109 then changes the assignment of the application products (Step 906). The processing in Step 906 will be described later in detail by referring to FIG. 11, which will be described later. Steps 905 and 906 are repeatedly executed until the assignment of the above items to the common frameworks are completely determined (Step 907). When the assignment is completely determined, the program 109 terminates the common framework assignment design processing. In this regard, "determination of the assignment to the common frameworks" means that the specific item of the change regarding the information of "to change the assignment" received in Step 901 is substantially entirely reflected in the assignment by common framework table 401.

As a result of the processing shown in FIG. 9, the user can freely select existing contents to be applied to the new system, using the common frameworks displayed on the input/output device 112.

FIG. 10 shows a detailed flow of the object achieving method assignment change processing (Step 905) of FIG. 9. The input/output device 112 receives a selection input to determine whether or not the assignment of the object achieving methods to the common frameworks is changed (Step 1001). If the input includes information not to change the assignment (NO in Step 1002), the program 109 terminates the processing. If the input includes information to change the assignment (YES in Step 1002), the input/output device 112 receives an object achieving method as a change object and a specific item of a change of the method (Step 1005). The object achieving method as the change object is selected from the "object achieving method 403" field of the assignment by common framework table 401 and the specific item of the change is selected from items such as "addition" and "deletion".

Next, according to the specific item of the change received in Step 1005, the program 109 changes (for example, adds or deletes) data in the "object achieving method 403" field of the table 401 (Step 1006). The input/output device 112 displays the assignment by common framework table 401 thus changed (Step 1007). The processing of steps 1005 to 1007 is repeatedly executed until the assignment of the object achieving methods is completely determined (Step 1008). When the assignment is determined, the object achieving method assignment processing is terminated. In this regard, "determination of the assignment to the object achieving methods" means that the specific item of the change of the assignment of the object achieving methods is substantially entirely reflected in the assignment by common framework table 401.

FIG. 11 shows a detailed flow of the application product assignment change processing (Step 906) of FIG. 9. The input/output device 112 receives a selection input to determine whether or not the assignment of the application products to the common frameworks is changed (Step 1101). If the input includes information not to change the assignment (NO in Step 1102), the program 109 terminates the processing. If the input includes information to change the assignment (YES in Step 1102), the input/output device 112 receives an application product as a change object (Step 1105). The application product as the change object is selected from the "application product 404" field of the assignment by common framework table 401 and the specific item of the change is selected from items such as "addition" and "deletion".

Next, according to the specific item of the change received in Step 1105, the program 109 changes (for example, adds or deletes) data in the "application product 404" field of the table 401 (Step 1106). The input/output device 112 displays the assignment by common framework table 401 thus changed (Step 1107). The processing of Steps 1105 to 1107 is repeatedly executed until the assignment of the application products is completely determined (Step 1108). When the assignment is completely determined, the application product assignment processing is terminated.

FIG. 12 shows a new system function table 1200 as a database used in the application requirement extraction processing (Step 205) of FIG. 2. The table 1200 is stored in, for example, the application requirement extraction result database 118.

The table 1200 is a table including functions of a new system extracted by the application requirement extraction processing (Step 205). The table 12 includes items such as "common framework 1201" as correspondence information with respect to common frameworks, "new work function 1202", "new system function 1203", "development plan by system function 1204", and "detailed design information 1205" including reusable information. When a new record is created, "null" is automatically set to the items. The table 1200 is a database and can also be used as an input/output screen when the input/output device 112 displays a table layout similar to the table 1200.

FIGS. 13A, 13B, and 13C show databases used in the application requirement extraction processing (Step 205). The databases are a work function comparison table 1300 (FIG. 13A), a system function comparison table 1301 (FIG. 13B), and a similar function name table 1311 (FIG. 13C). The tables 1300 and 1301 are stored in, for example, the application requirement extraction result database 118. The table 1311 is stored in, for example, the application requirement extraction support database 117.

The table 1300 (FIG. 13A) is a database to compare an object achieving method with a work function of an application product to extract a development plan for each work function. The table 1300 includes items such as a common framework 1302, a new work function 1303, an object achieving method work function 1304, an application product work function 1305, and a development plan by work function 1306. When a new record is created, "null" is automatically set to the items.

The system function comparison table 1301 (FIG. 13B) is a database to compare an object achieving method with a system function of an application product to extract a development plan for each system function. The table 1301 includes items of a new work function 1312, a new system function 1307, an object achieving method system function 1308, an application product system function 1309, and a development plan by system function 1310. When a new record is created, "null" is automatically set to the items.

The similar function name table 1311 (FIG. 13C) is a database having stored a table of similar function names of the work and system functions (specifically, functions having mutually different names but having the same function). When an object achieving method is compared with a work/system function of an application product, the table 1311 is used as a criterion to determine a correspondence therebetween.

Figure 14:
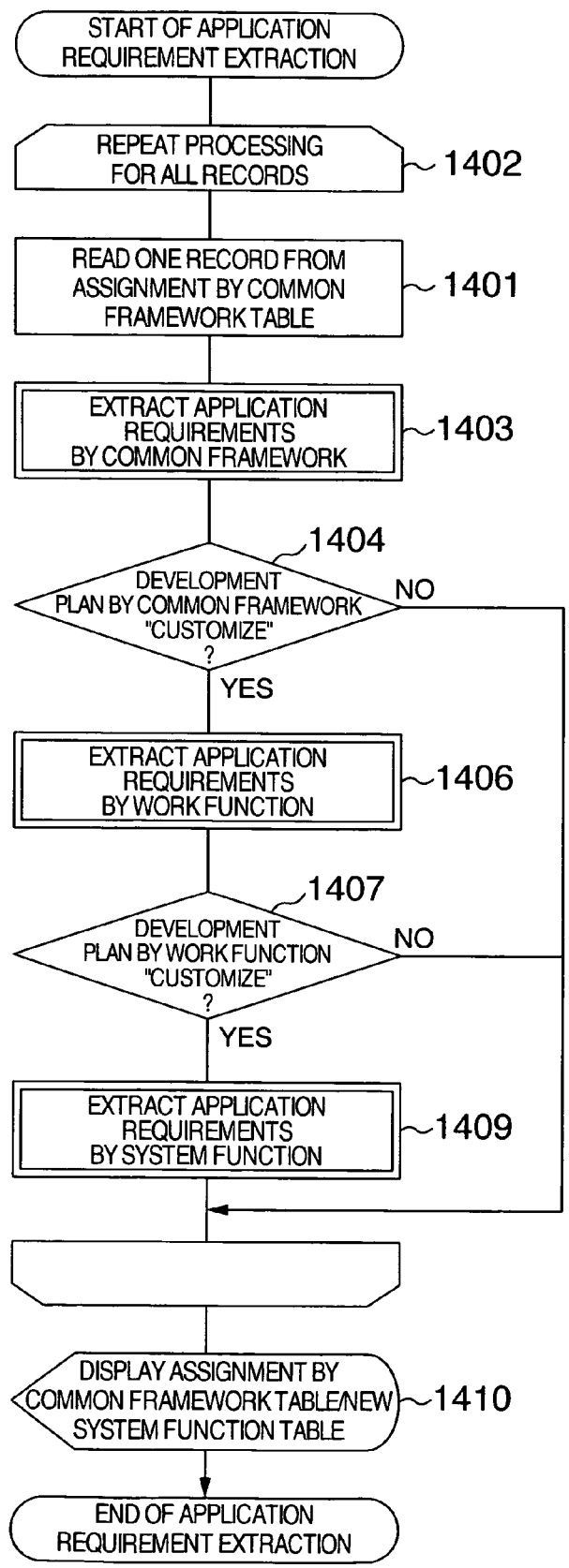
FIG. 14 is a flowchart showing in detail application requirement extraction processing (Step 205 of FIG. 2)

FIG. 14 shows in detail the application requirement extraction processing (Step 205) of FIG. 2. As described above, the application requirements include work functions and system functions of a new system, development plans of the functions, and existing design information reusable to develop the functions according to the plans (design information of object achieving methods and application products). "Development plan" includes "function application" to apply a standard function of an application product as a function of the new system, "customize" to customize a specification of a standard function of an application product, or "new development" to develop, since a function corresponding to an object achieving method is not provided as a standard function, the function of the object achieving method. This embodiment is aimed at finally extracting a development plan for each system function. For this purpose, development plans are also extracted for each of the common frameworks and for each of the work functions. Description will next be given in detail of each Step shown in FIG. 14.

The application requirement extraction program 110 reads one record from the assignment by common framework table 401 (Step 1401). For each record, application requirements are extracted in steps described below. The steps are repeatedly executed until the processing is finished for all records (Step 1402).

The program 110 extracts application requirements for each common framework (a work/system function, a development plan, and reusable design information; Step 1403). The processing of Step 1403 will be described in detail later by referring to FIG. 15. The program 110 makes a check to determine whether or not the common frame development plan extracted in Step 1403 is "customize" (Step 1404). If the plan is not "customize", that is, the plan is "function application" or "new development" (NO in Step 1404), the program 110 finishes the application requirement extraction for the record and returns to the first Step (Step 1401) of the iteration.

Figure 16:
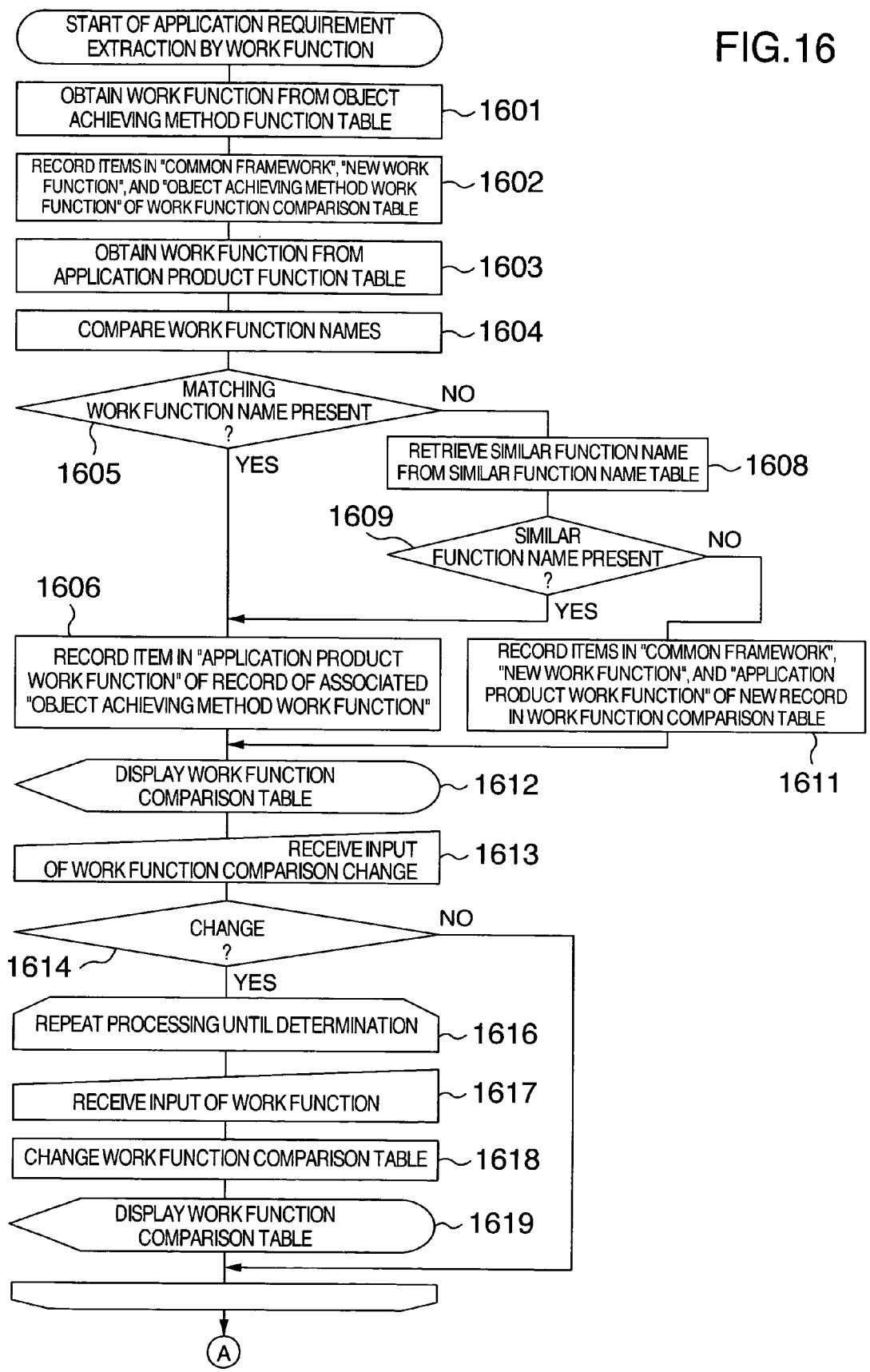
FIG. 16 is a flowchart showing in detail processing of application requirement extraction for each work function (Step 1406 of FIG. 14)
Figure 17:
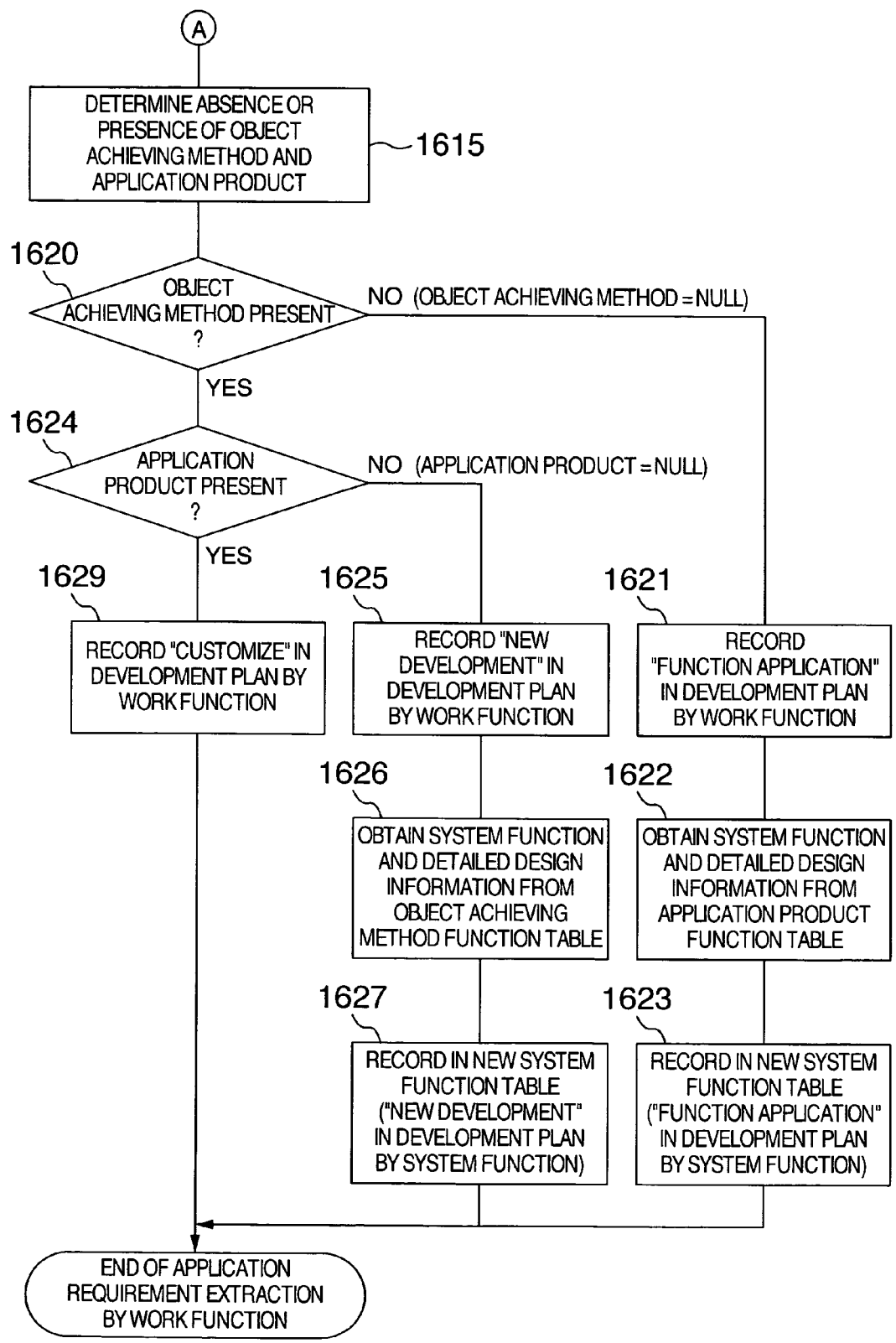
FIG. 17 is a flowchart showing in detail processing of application requirement extraction for each work function after the processing of FIG. 16 (Step 1406 of FIG. 14)

If the plan is "customize" (YES in Step 1404), the program 110 extracts an application requirement for each work function (Step 1406). In this connection, FIGS. 16 and 17 show a detailed processing flow of Step 1406. The program 110 determines whether or not the work function development plan extracted in Step 1406 is "customize" (Step 1407). If the plan is not "customize", that is, the plan is "function application" or "new development" (NO in Step 1407), the program 110 finishes the application requirement extraction for the record and returns to the first step (Step 1401) of the iteration.

Figure 18:
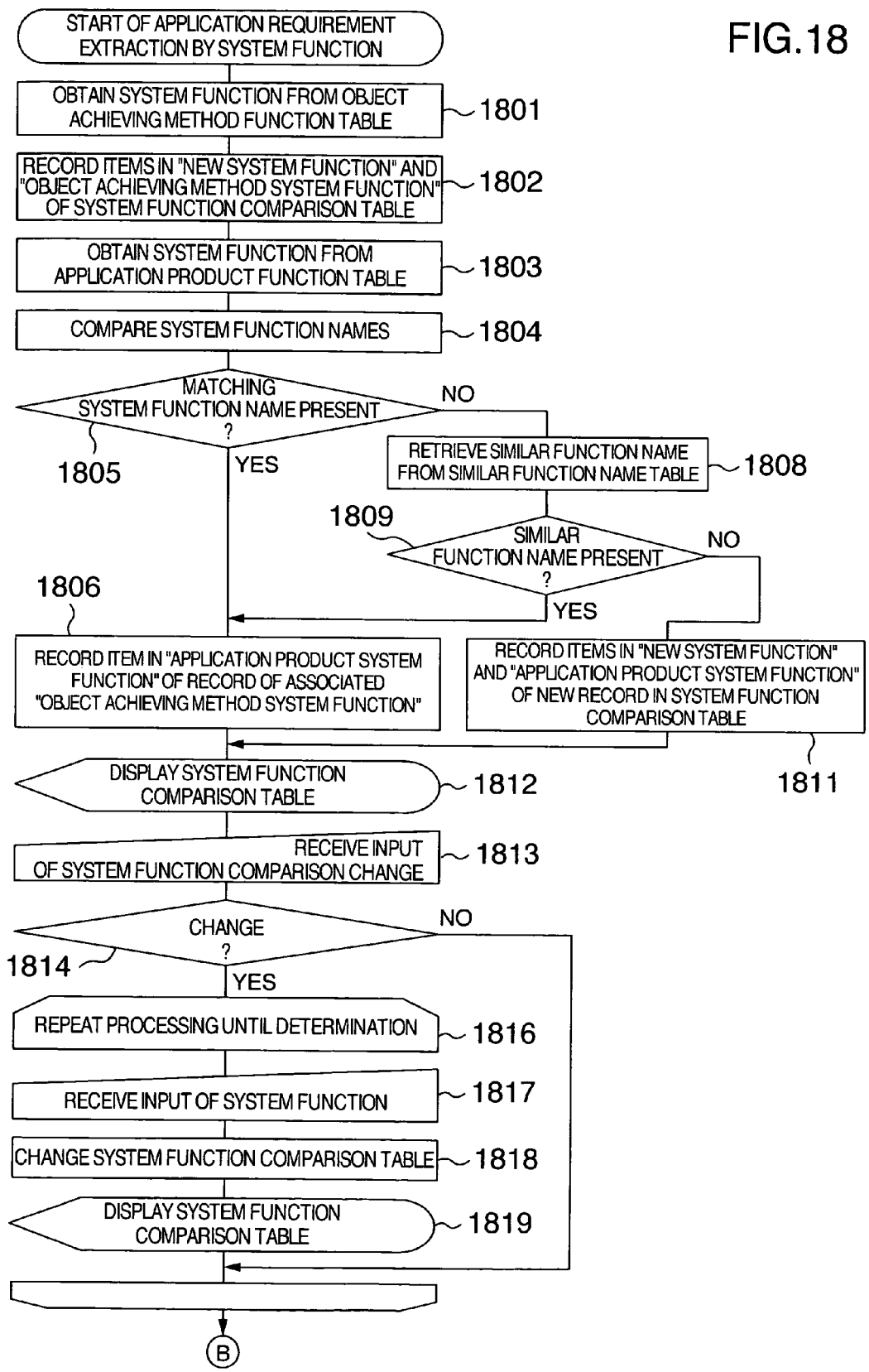
FIG. 18 is a flowchart showing in detail processing of application requirement extraction for each system function (Step 1409 of FIG. 14)
Figure 19:
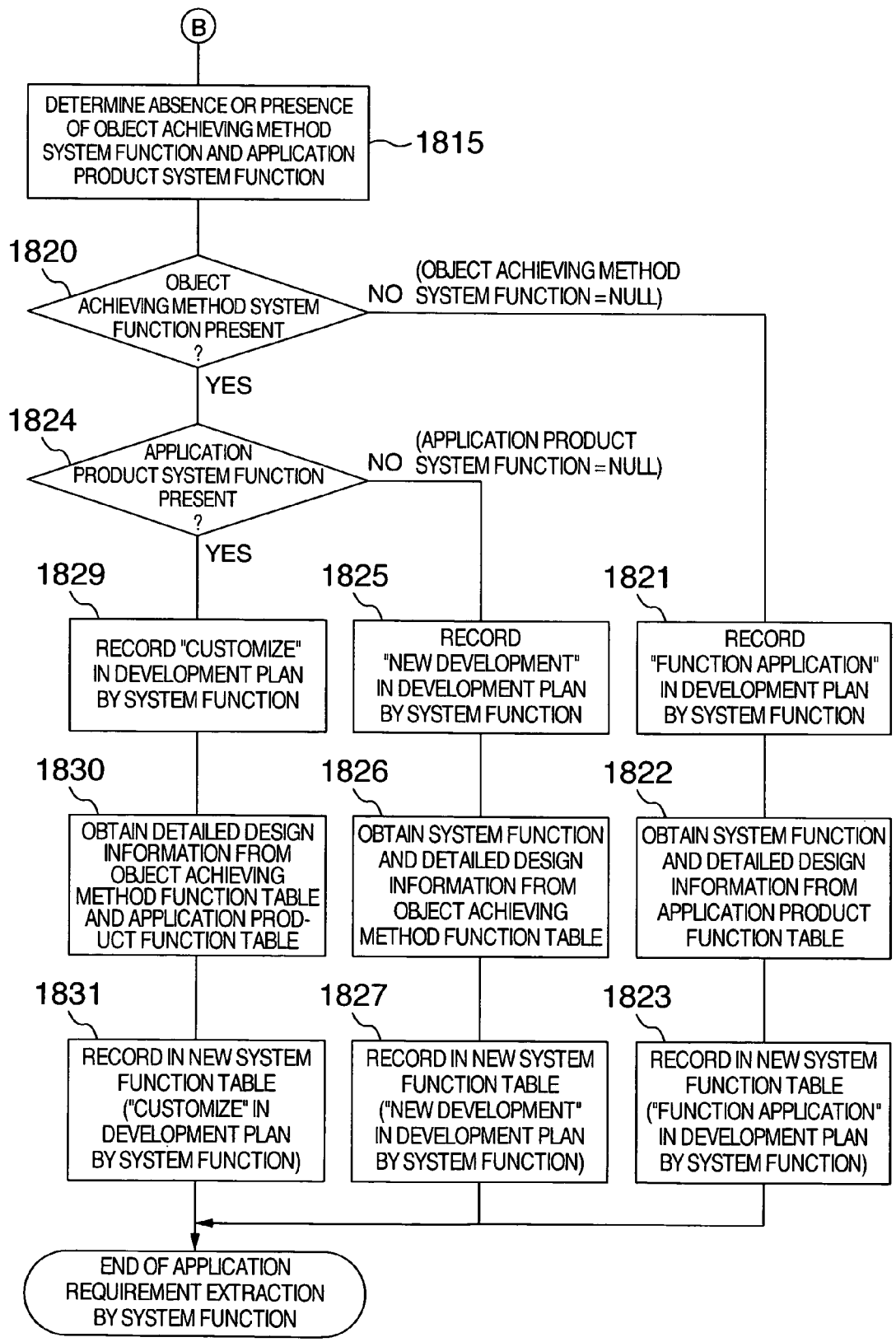
FIG. 19 is a flowchart showing in detail processing of application requirement extraction for each system function after the processing of FIG. 18 (Step 1409 of FIG. 14).

If the plan is "customize" (YES in Step 1407), the program 110 extracts an application requirement for each system function (Step 1409). FIGS. 18 and 19 show a detailed processing flow of Step 1409.

When the steps are finished for all records, the input/output device 112 displays the assignment by common framework table 401 and the new system function table 1200 (Step 1410). The program 110 then terminates the application requirement extraction. The table 1200 is displayed for each common framework. When the user selects "common framework 402" from the displayed table 401, the device 112 displays a new system function table 1200 for the selected common framework.

Figure 15:
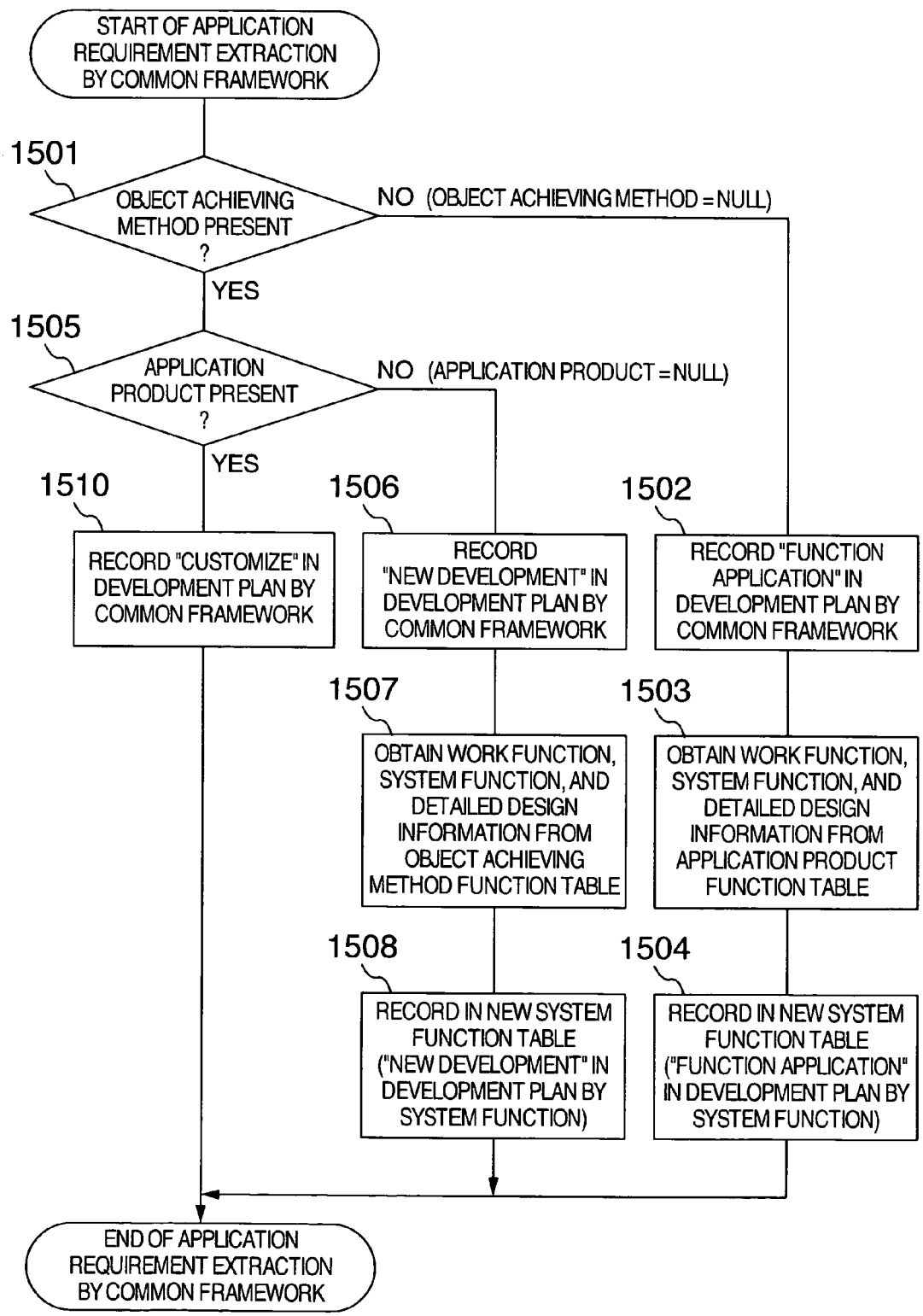
FIG. 15 is a flowchart showing in detail processing of application requirement extraction for each common framework (Step 1403 of FIG. 14)

FIG. 15 shows in detail the application requirement extraction processing for each common framework (Step 1403) of FIG. 14. The application requirement extraction program 110 first makes a check to determine whether or not actual data items have been stored in the fields of "object achieving method 403" and "application product 404" of the record of the assignment by common framework table 401 read in Step 1401 of FIG. 14. That is, a check is made to determine whether or not actual data is present in the object achieving method 403 field of the record (Step 1501). If the actual data is not present, that is, "null" is in the field 403 of the record (NO in Step 1505), the program 110 records "function application" in the field of "development plan by common framework 405" of the record (Step 1502).

The program 110 then accesses the application product function table 701 (FIG. 7B) stored in "application product 404" of the record to obtain therefrom information items stored respectively in "work function 703", "system function 704", and "detailed design information 705" of "common framework 702" corresponding to the common framework 402 of the record (Step 1503). The program 110 then records the information items respectively in "common framework 1201", "new work function 1202", "new system function 1203", and "detailed design information 1205" of the new system function table 1200 (FIG. 12) and then records "function application" in "development plan by system function 1204" associated with the items (Step 1504).

When actual data is present in "object achieving method 403" of the record, that is, the data therein is other than "null" (YES in Step 1501), a check is made to determine whether or not actual data is present in "application product 404" of the record (Step 1505). If the actual data is not present, that is, "application product 404" is "null", the program 110 records "new development" in "development plan by common framework 405" corresponding to the record of the assignment by common framework table 401 (Step 1506). The program 110 acquires, from the table 601 (FIG. 6B) corresponding to "object achieving method 403 of the record"; "work function 606", "system function 607", and "detailed design information 608" of "common framework 605" corresponding to the common framework 402 of the record (Step 1507). The program 110 then writes the obtained items respectively in "common framework 1201", "new work function 1202", "new system function 1203", and "detailed design information 1205" of the new system function table 1200 and records "new development" in "development plan by system function 1204" corresponding to the items (Step 1508).

If actual data is present in "application product 404" of the record in Step 1505, that is, the application product 404 is not "null" (YES in Step 1505), the program 110 records "customize" in the field of "development plan by system function 405" corresponding to the record of the assignment by common framework table 401 (Step 1510). As above, "customize" means that a standard function of an application product is customized to implement a function of an object achieving method. In this regard, description will not be given of the new system function table 1200. The system then terminates the execution of the application requirement processing for each common framework shown in FIG. 15.

FIGS. 16 and 17 show detailed processing flows of the processing of application requirement extraction for each work function (Step 1406) of FIG. 14. Using a common framework stored in the field of "common framework 402" of one record in the assignment by common framework table 401 read in Step 1401 of FIG. 14, the program 110 makes a search through the object achieving method function table 601 (FIG. 6B) to obtain information stored in the field of "work function 606" of the table 601 corresponding to an object achieving method stored in "object achieving method 403" of the record (Step 1601).

The program 110 then records the information stored in "common framework 402" of the record in "common framework 1302" of the work function comparison table 1300 (FIG. 13A) and records the information stored in "work function 606" obtained in Step 1601 in "new work function 1303" and "object achieving method work function 1304" of the table 1300 (Step 1602).

Using common framework stored in "common framework 402" of the record, the program 110 makes a search through the application product function table 701 (FIG. 7B) to obtain a work function stored in "work function 703" of the table 701 corresponding to the application product stored in "application product 404" of the record (Step 1603).

The program 110 compares the work function name in "work function 703" of the application product obtained in Step 1603 with the work function name of "object achieving method work function 1304" of the table 1300 (FIG. 13A; Step 1604). If the work function names are the same with each other, that is, matches with each other (YES in Step 1605), the program 110 records the work function name of "work function 703" in "application product work function 1305" of the record associated with the name of "object achieving method work function 1304" (Step 1606). If the work function names are not same with each other, that is, do not match with each other (NO in Step 1605), the program 110 searches for a work function name similar to the work function name through the similar function name table 1311 (FIG. 13C; Step 1608). Specifically, The search in Step 1608 is conducted as below. Assume that there exists, for example, a work function name including a character string listed as function name 1 in the table 1311. In the operation, a check is made to determine whether or not, when the character string is replaced with a character string of function name 2 associated therewith, the resultant function name matches with the work function name. The search is conducted to determine a situation in which although the work function names do not match with each other, there exists a work function name similar to the pertinent work function name.

As a result of the search in Step 1608, it is determined whether or not there exists a similar work function name (Step 1609). If such a name is present (YES in Step 1609), the program 110 records the work function name of "work function 703" in "application product work function 1305" of the record associated with "object achieving method work function 1304" of the similar name (Step 1606). If such a name is present in Step 1609 (NO in Step 1609), the program 110 adds a new record to the work function comparison table 1300 (FIG. 13A), stores "common framework 402" of the pertinent record in "common framework 1302", and stores "work function 703" obtained in Step 1603 in "new work function 1303" and "application product work function 1305" (Step 1611).

The input/output device 112 displays the work function comparison table 1300 thus created (Step 1612) to receive an input to change work function comparison (Step 1613). The program 110 makes a check to determine whether or not information inputted by the user indicates a change for work function comparison (Step 1614). If the information indicates the change, that is, if it indicates a situation in which the table 1300 displayed in Step 1612 is modified to change the work function comparison (YES in Step 1614), the device 112 receives inputs of an item of "application work function" to be changed and a specific change (another record or movement to a new record; Step 1617). According to the inputted information, the application requirement extraction program 110 changes the data in "application product work function name 1305" (Step 1618). The input/output device 112 displays the work function comparison table 1300 changed as a result (Step 1619). The processing of steps 1617 to 1619 is repeatedly executed until the correspondence between "object achieving method work function 1304" and "application product work function 1305" is determined (Step 1616). The determination of the correspondence is achieved by making a check to determine whether or not information indication of the determination has been inputted from the user.

When the change of the work function comparison is determined as a result of the repeated execution of the processing of Steps 1617 to 1619 or the input information received in Step 1613 indicates that the work function comparison is not to be changed, that is, the work function comparison is determined according to the work function comparison table 1.300 displayed in Step 1612 (NO in Step 1614), the program 110 makes a check to determine whether or not actual data items exist in "object achieving method work function 1304" and "application product work function 1305" of the table 1300 (Step 1615).

First, the program 110 makes a check to determine whether or not actual data is present in the field of "object achieving method work function 1304" (Step 1620). If actual data is absent, that is, the field 1304 is "null" (NO in Step 1620), the program 110 records "function application" in an associated field of "development plan by work function 1306" of the table 1300 (Step 1621). The program 110 then obtains information items from "work function 703", "system function 704", and "detailed design information 705" associated with the common framework of the application product function table 701 (FIG. 13B; Step 1622). The program 110 records the obtained information and associated common framework information respectively in the fields of "common framework 1201", "new work function 1202", "new system function 1203", and "detailed design information 1205" of the new system function table 1200 (FIG. 12) and then records "function application" in "development plan by system function 1204" of the table 1200 (Step 1623).

If actual data is present in "object achieving method work function 1304" of the table 1300 as a result of the determination in Step 1620 (YES in Step 1620), the program 110 makes a check to determine whether or not actual data is present in "application product work function 1305" (Step 1624). If actual data is absent, that is, data in the field 1305 is "null" (NO in Step 1624), the program 110 records "new development" in "development plan by work function 1306" of the table 1300 (Step 1625). Next, from the object achieving method function table 601 (FIG. 6B) corresponding to the actual data (work achieving method) recorded in "object achieving method work function 1304", the program 110 obtains "system function 604" and "detailed design information 605" of the object achieving method (Step 1626). The program 110 then records the associated items respectively in "common framework 1201", "new work function 1202", "new system function 1203", and "detailed design information 1205" of the new system function table 1200 (Step 1627). The program 110 records "new development" in "development plan by system function 1204" of the table 1200 (FIG. 12; Step 1627).

If actual data is present in "application product work function 1305" as a result of the determination in Step 1624 (YES in Step 1624), the program 110 writes "customize" in the field of associated "development plan by work function 1306"

(Step 1629). This terminates the execution of the processing to extract application requirements for each work function.

FIGS. 18 and 19 show detailed processing flow of the application requirement extraction processing for each system function (Step 1409) of FIG. 14. Using, as a key, a common framework stored in the field of "common framework 402" of the record obtained in Step 1401, the program 110 makes a search through the object achieving method function table 601 (FIG. 6B) to obtain information from the field of "system function 607" corresponding to "object achieving method 403" of the record (Step 1801).

Thereafter, the program 110 records the information items obtained in Step 1801 in "new system function 1307" and "object achieving method system function 1308" of the system function comparison table 1301 (Step 1802). Using, as a key, the common framework stored in "common framework 402" of the record, the program 110 makes a search through the application product function table 701 (FIG. 7B) to obtain a system function stored in "system function 704" of the table 701. The program 110 compares the system function with the system function stored in "object achieving method system function 1308" of the system function comparison table 1301 (Step 1804).

According to a result of the comparison in Step 1804, the program 110 determines whether or not a system function matching with the system function exists in the table 1301 (Step 1805). If a system function having the system function name of the pertinent system function is present (YES in Step 1805), the program 110 records the system function name in "application product system function 1309" of the record associated with "object achieving method system function 1308" having the same name (Step 1806). If such a system function matching with the pertinent system function is absent (NO in Step 1805), the program 110 retrieves a similar system function name using the similar function name table 1311 (Step 1808). The retrieval through the table 1311 is similar to that conducted in Step 1608 of FIG. 16.

According to the retrieval in Step 1808, the program 110 determines whether or not such a similar system function name is present (Step 1809). If this is the case (YES in Step 1809), the program 110 records the system function of "system function 703" in "application product system function 1309" of the record including "object achieving method system function 1308" having the similar name (Step 1806). As a result of the determination in Step 1809, if such a similar function name is absent (NO in Step 1809), the program 110 adds a new record to the system function comparison table 1301 and records "system function 703" obtained in Step 1803 in "new system function 1307" and "application product system function 1309" (Step 1811).

Next, the input/output device 112 displays the resultant system function comparison table 1301 (Step 1812). The device 112 also receives an input for a change of system function comparison to change the table 1301 (Step 1813). The program 110 makes a check to determine whether or not information inputted by the user indicates a change for system function comparison (Step 1814). If the information indicates the change, that is, if it indicates a situation in which the table 1301 displayed in Step 1811 is modified to change the system function comparison (YES in Step 1814), the input/output device 112 receives inputs "application system function" to be changed and a specific item of the change (another record or movement to a new record; Step 1817). According to the inputted information, the application requirement extraction program 110 changes the data in "application product system function name 1309" (Step 1818). The device 112 displays the system function comparison table 1301 changed as a result (Step 1819). In this connection, the processing of steps 1817 to 1819 is repeatedly executed until the correspondence between "object achieving method system function 1308" and "application product system function 1309" is determined (Step 1816). The determination of the correspondence is achieved by making a check to determine whether or not information indication of the determination has been inputted from the user.

When the change of the work function comparison is determined as a result of the repeated execution of the processing of Steps 1817 to 1819 or the input information received in Step 1813 indicates that the system function comparison is not to be changed, that is, the system function comparison is determined according to the system function comparison table 1301 displayed in Step 1812 (NO in Step 1814), the program 110 makes a check to determine whether or not actual data items exist in "object achieving method system function 1308" and "application product system function 1309" of the table 1301 (Step 1815).

First, the program 110 determines whether or not actual data is present in the field of "object achieving method system function 1308" (Step 1820). If actual data is absent, that is, the field 1308 is "null" (NO in Step 1820), the program 110 records "function application" in an associated field of "development plan by system function 1310" of the table 1301 (Step 1821). The program 110 then obtains information items from "system function 704" and "detailed design information 705" associated with the common framework of the application product function table 701 (FIG. 13B; Step 1822). The program 110 records the obtained information and associated common framework information in the fields of "common framework 1201", "new work function 1202", "new system function 1203", and "detailed design information 1205" of the new system function table 1200 (FIG. 12) and then records "function application" in "development plan by system function 1204" of the table 1200 (Step 1823).

If actual data is present in "object achieving method system function 1308" of the table 1301 as a result of the determination in Step 1820 (YES in Step 1820), the program 110 makes a check to determine whether or not actual data is present in "application product system function 1309" (Step 1824). If actual data is absent, that is, data in the field 1309 is "null" (NO in Step 1824), the program 110 records "new development" in "development plan by system function 1310" of the table 1301 (Step 1825). Next, from the object achieving method function table 601 (FIG. 6B) corresponding to the actual data (work achieving method) recorded in "object achieving method work function 1304", the program 110 obtains "system function 604" and "detailed design information 605" of the object achieving method (Step 1826). The program 110 then records the associated items respectively in "common framework 1201", "new work function 1202", "new system function 1203", and "detailed design information 1203" of the new system function table 1200 (Step 1827). The program 110 records "new development" in "development plan by system function 1204" of the table 1200 (FIG. 12; Step 1827).

If actual data is present in "application product system function 1309" of the table 1301 as a result of the determination in Step 1824 (YES in Step 1824), the program 110 describes "customize" in associated "development plan by system function 1310" (Step 1829). The program 110 obtains "detailed design information 608" and "detailed design information 705" respectively from the object achieving method function table 601 and the application product function table 701 (Step 1830).

The program 110 records a common framework stored in "common framework 402" of the record obtained in Step 1401 (FIG. 14), "new work function 1312" and "new system function 1307" of the system function comparison table 1301

(FIG. 13B) determined in a preceding stage of Step 1815, and the detailed design information items 608 and 705 obtained in Step 1830 respectively in "common framework 1201", "new work function 1202", "new system function 1203", and "detailed design information 1205" of the new system function table 1200 (FIG. 12; Step 1831). The program 110 then records "customize" in "development plan by system function 1204" of the table 1200 (Step 1831). The system terminates the processing to extract application requirements for each system function.

In the embodiment, to implement an object achieving method corresponding to new customer requirements, functions of existing application products are used according to necessity to design application requirements of a new system. However, there may be implemented an embodiment in which without using functions of existing application products, application requirements of a new system are designed using only object achieving methods (the functions other than those of the object achieving methods are developed as new functions). It is also possible to implement an embodiment in which the standard functions of existing application products are used such that functions of object achieving methods are incorporated in the standard functions or an embodiment in which standard functions of an application product are incorporated in standard functions of another application product.

In the description of the embodiment, a method to design application requirements of a new system is used as an example. However, by storing the application requirements of the new system designed according to the present invention in an existing contents database 116, the application requirements can also be reused for new customer requirements. As a result, the existing contents to be reused are increased. This leads to an advantage that the design of application requirements can cope with an increased number of various new customer requirements.

By adding the application requirements of the new system designed according to the present invention to the existing application products as standard functions, it is possible to extend functions of the existing application products.

Even users other than those having experiences of system construction or installation can easily design application requirements to construct a new system with fixed quality by use of the existing design information.

By using the application requirement design support method according to the present invention, some items of know-how based on system construction cases in the past can be combined with each other and know-how (a specific method of achieving an object of a customer) based on system construction cases in the past can be incorporated in a standard specification of an existing application product. Therefore, it is possible to design application requirements of a new system according to further various customer requirements.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An application requirement design support system for supporting design of a new case inputted thereto, by reusing existing contents beforehand stored, comprising:

processors;

receiving means for receiving information regarding the new case;

common systemic hierarchical framework extracting means for extracting common systemic hierarchical frameworks associated with at least one systemic hierarchical work function contained in the information regarding the new case from a common systemic hierarchical framework database having stored common systemic hierarchical frameworks corresponding to candidate systemic hierarchical work functions, where each common systemic hierarchical framework lists a plurality of interrelated work functions at a plurality of different gradation levels of detail, the at least one systemic hierarchical work function being for utilization in a systemic hierarchical system application, the extracting effected by using the information regarding the new case as a searching key, the common systemic hierarchical frameworks having correspondence relationships to design information of all the existing contents;

existing contents extracting means for extracting existing contents corresponding to the information regarding the new case from an application product table and an application product function table by using the information regarding the new case, the existing contents including an existing application product and an object achieving method;

common systemic hierarchical framework assigning means for assigning the existing application product and the object achieving method which are the existing contents thus extracted to the common systemic hierarchical frameworks thus extracted and creating an assignment table for each common systemic hierarchical framework;

application requirement extracting means for extracting, according to the assignment table thus created, application requirements associated with the new case received by the receiving means; and wherein the assignment table created for each common systemic hierarchical framework is associated with, for an associated common systemic hierarchical framework, object achieving methods and application products of systemic hierarchical work functions associated with the associated common systemic hierarchical framework.

2. The application requirement design support system according to claim 1, wherein the common systemic hierarchical frameworks are hierarchically defined according to systemic hierarchical work functions associated with the common systemic hierarchical frameworks.

3. An application requirement design support system for supporting design of a new case inputted thereto, by reusing existing contents beforehand stored, comprising:

processors:

a receiving section that receives information regarding the new case;

a common systemic hierarchical framework database that stores therein common systemic hierarchical frameworks corresponding to candidate systemic hierarchical work functions, where each common systemic hierarchical framework lists a plurality of interrelated work functions at a plurality of different gradation levels of detail;

a common systemic hierarchical framework extracting section that extracts common systemic hierarchical frameworks associated with at least one systemic hierarchical work function contained in the information regarding the new case from the common systemic hierarchical framework database, the at least one systemic hierarchical work function being for utilization in a systemic hierarchical system application, the extracting effected by using the information regarding the new case as a searching key, the common systemic hierarchical frameworks having correspondence relationships to design information of all the existing contents;

an existing contents database that stores therein the existing contents;

an existing contents extracting section that extracts existing contents corresponding to the information regarding the new case from an application product table and an application product function table by using the information regarding the new case, the existing contents including an existing application product and an object achieving method;

a common systemic hierarchical framework assigning section that assigns the existing application product and the object achieving method which are the existing contents thus extracted to the common systemic hierarchical frameworks thus extracted and creates an assignment table for each common systemic hierarchical framework;

an application requirement extracting section that extracts, according to the assignment table thus created, application requirements associated with the new case received by the receiving section; and wherein the assignment table created for each common systemic hierarchical framework is associated with, for an associated common systemic hierarchical framework, object achieving methods and application products of systemic hierarchical work functions associated with the associated common systemic hierarchical framework.

4. The application requirement design support system according to claim 3, wherein the existing contents database comprises:

a table regarding object achieving method functions that stores therein common systemic hierarchical frameworks, work functions, and system functions associated with object achieving methods corresponding to existing contents with a correspondence established there between; and a table regarding application products that stores therein common systemic hierarchical frameworks, work functions, and system functions associated with application products corresponding to existing contents with a correspondence established there between.

5. The application requirement design support system according to claim 3, wherein:

the information regarding the new case includes an objective systemic hierarchical work function kind and an objective systemic hierarchical work function corresponding to the new case; and the common systemic hierarchical framework extracting section obtains from the common systemic hierarchical frameworks stored in the common systemic hierarchical framework database, a common systemic hierarchical framework for which the objective systemic hierarchical work function kind and the objective systemic hierarchical work function match, and then records the common systemic hierarchical framework in the assignment table for each common systemic hierarchical framework.

6. The application requirement design support system according to claim 4, wherein:

the existing contents database includes a table regarding an object achieving method establishing a correspondence between the work object and the common systemic hierarchical framework and a table regarding functions of an application product stored in the table regarding the application products;

the existing contents extracting section makes a search, according to the common systemic hierarchical framework and the work case, through the table regarding the object achieving methods to obtain an object achieving method and a common systemic hierarchical framework corresponding to the new case;

records the object achieving method thus obtained, in association with the common systemic hierarchical framework contained in the assignment table for each common systemic hierarchical framework;

makes a search, according to the common systemic hierarchical framework and the system requirements corresponding to the new case, through the table regarding the application products and the table regarding the application product functions to obtain an application product corresponding to the new case and a common systemic hierarchical framework corresponding thereto; and records information regarding the application product thus obtained in the assignment table for each common systemic hierarchical framework, the information being as an application product corresponding to the common systemic hierarchical framework thus obtained.

7. The application requirement design support system according to claim 3, wherein the common systemic hierarchical framework assigning section receives an input to determine whether or not assignment of the existing contents thus extracted to the common systemic hierarchical frameworks is changed and then changes, if the input is information to change the assignment, the assignment of the object achieving method and the assignment of the application product.

8. The application requirement design support system according to claim 7, wherein if the input to determine whether or not the assignment is changed indicates a change of assignment of the object achieving method, the common systemic hierarchical framework assigning section changes, according to an object achieving method as the object of the change and a specific item of the change, the object achieving method as the object of the change, the object achieving method being contained in the assignment table for each common systemic hierarchical framework.

9. The application requirement design support system according to claim 7, wherein if the input to determine whether or not the assignment is changed indicates a change of assignment of the application product, the common systemic hierarchical framework assigning section changes, according to an application product as the object of the change and a specific item of the change thereof, the application product as the object of the change, the application product being contained in the assignment table for each common systemic hierarchical framework.

10. The application requirement design support system according to claim 3, further comprising an application requirement extraction result database for storing therein a new system function table including a new system function extracted by the application requirement extracting section.

11. The application requirement design support system according to claim 3, further comprising an application requirement extraction support database for storing therein a systemic hierarchical work function comparison table including systemic hierarchical work functions of an object achieving method, systemic hierarchical work functions of an application product, and development plans by systemic hierarchical work function.

12. The application requirement design support system according to claim 11, wherein the application requirement extraction support database further stores therein a system function comparison table including system functions of an object achieving method, system functions of an application product, and development plans by system function.

13. The application requirement design support system according to claim 3, wherein the common systemic hierarchical frameworks are hierarchically defined according to systemic hierarchical work functions associated with the common systemic hierarchical frameworks.

14. An application requirement design support method for use in an application requirement design support system comprising a server for storing therein existing contents and a client connected to the server for receiving a new case for supporting design of the new case inputted thereto, by reusing the existing contents, comprising operations of:
receiving, by the client, information regarding the new case;
storing, by the server, common systemic hierarchical frameworks associated with the new case in a common systemic hierarchical framework database, where each common systemic hierarchical framework lists a plurality of interrelated work functions at a plurality of different gradation levels of detail;
extracting, by the client, common systemic hierarchical frameworks associated with at least one systemic hierarchical work function contained in the information regarding the new case from the common systemic hierarchical framework database, the at least one systemic hierarchical work function being for utilization in a systemic hierarchical system application, the extracting effected by using the information regarding the new case as a searching key, the common systemic hierarchical frameworks having correspondence relationships to design information of all the existing contents;
storing, by the server, the existing contents in an existing contents database; extracting, by the client, existing contents corresponding to the information regarding the new case from an application product table and an application product function table by using the information regarding the new case, the existing contents including an existing application product and an object achieving method;
assigning, by the client, the existing application product and the object achieving method which are the existing contents thus extracted to the common systemic hierarchical frameworks thus extracted and creating an assignment table for each common systemic hierarchical framework;
extracting, according to the assignment table thus created, application requirements associated with the new case received by the receiving operation; and
wherein the assignment table created for each common systemic hierarchical framework is associated with, for an associated common systemic hierarchical framework, object achieving methods and application products of systemic hierarchical work functions associated with the associated common systemic hierarchical framework.

15. The application requirement design support method according to claim 14, wherein:
the information regarding the new case includes an objective systemic hierarchical work function kind and an objective systemic hierarchical work function corresponding to the new case; and
the common systemic hierarchical framework extracting operation further comprises obtaining, from the common systemic hierarchical frameworks stored in the common systemic hierarchical framework database, a common systemic hierarchical framework for which the objective systemic hierarchical work function kind and the objective systemic hierarchical work function match, and records the common systemic hierarchical framework in the assignment table for each common systemic hierarchical framework.

16. The application requirement design support method according to claim 14, wherein the common systemic hierarchical framework assigning operation further comprises:
receiving an input to determine whether or not the assignment of the existing contents thus extracted to the common systemic hierarchical framework is changed; and
changing, if the input indicates information to change the assignment, the assignment of the object achieving method and the assignment of the application product.

17. The application requirement design support method according to claim 16, wherein the common systemic hierarchical framework assigning operation further comprises: changing, if the input to determine whether or not the assignment is changed indicates a change of the assignment of the object achieving method, according to an object achieving method as the object of the change and a specific item of the change thereof, the object achieving method as the object of the change, the object achieving method being contained in the assignment table for each common systemic hierarchical framework.

18. The application requirement design support method according to claim 16, wherein the common systemic hierarchical framework assigning operation further comprises: changing, if the input to determine whether or not the assignment is changed indicates a change of the assignment of the application product, according to an application product as the object of the change and a specific item of the change thereof, the application product as the object of the change, the application product being contained in the assignment table for each common systemic hierarchical framework.

19. A program product embodied on a non-transitory computer-readable medium and embodying a program to be executed in an application requirement design support system comprising a server for storing therein existing contents and a client connected to the server for receiving a new case for supporting design of the new case inputted thereto, by reusing the existing contents, the program executing operations comprising:
receiving information regarding the new case;
extracting common systemic hierarchical frameworks associated with at least one systemic hierarchical work function contained in the information regarding the new case from a common systemic hierarchical framework database having stored common systemic hierarchical frameworks corresponding to candidate systemic hierarchical work functions, where each common systemic hierarchical framework lists a plurality of interrelated work functions at a plurality of different gradation levels of detail, the at least one systemic hierarchical work function being for utilization in a systemic hierarchical system application, the extracting effected by using the information regarding the new case as a searching key, the common systemic hierarchical frameworks having correspondence relationships to design information of all the existing contents;
extracting existing contents corresponding to the information regarding the new case from an application product table and an application product function table by using the information regarding the new case, the existing contents including an existing application product and an object achieving method;

assigning the existing application product and the object achieving method which are the existing contents thus extracted to the common systemic hierarchical frameworks thus extracted and creating an assignment table for each common systemic hierarchical framework;

extracting, according to the assignment table thus created, application requirements associated with the new case thus received; and wherein the assignment table created for each common systemic hierarchical framework is associated with, for an associated common systemic hierarchical framework, object achieving methods and application products of systemic hierarchical work functions associated with the associated common systemic hierarchical framework.

20. An application requirement design support system for supporting design of a new case inputted thereto, by reusing existing contents beforehand stored, comprising:

processors:

receiving means for receiving information regarding the new case;

common industry-hierarchical framework extracting means for extracting common industry-hierarchical frameworks associated with at least one industry-hierarchical work function contained in the information regarding the new case from a common industry-hierarchical framework database having stored common industry-hierarchical frameworks corresponding to candidate industry-hierarchical work functions, where each common industry-hierarchical hierarchical framework lists a plurality of interrelated work functions at a plurality of different gradation levels of detail, the at least one industry-hierarchical work function being for utilization in a industry-hierarchical system application, the extracting effected by using the information regarding the new case as a searching key, the common industry-hierarchical frameworks having correspondence relationships to design information of all the existing contents; existing contents extracting means for extracting existing contents corresponding to the information regarding the new case from an application product table and an application product function table by using the information regarding the new case, the existing contents including an existing application product and an object achieving method;

common industry-hierarchical framework assigning means for assigning the existing application product and the object achieving method which are the existing contents thus extracted to the common industry-hierarchical frameworks thus extracted and creating an assignment table for each common industry-hierarchical framework;

application requirement extracting means for extracting, according to the assignment table thus created, application requirements associated with the new case received by the receiving means; and wherein the assignment table created for each common systemic hierarchical framework is associated with, for an associated common systemic hierarchical framework, object achieving methods and application products of systemic hierarchical work functions associated with the associated common systemic hierarchical framework.

* * * * *